(12) United States Patent
Nakamura et al.

(10) Patent No.: US 10,453,614 B2
(45) Date of Patent: Oct. 22, 2019

(54) MULTILAYER CERAMIC CAPACITOR AND MANUFACTURING METHOD OF MULTILAYER CERAMIC CAPACITOR

(71) Applicant: TAIYO YUDEN CO., LTD., Chuo-ku, Tokyo (JP)

(72) Inventors: Tomoaki Nakamura, Takasaki (JP); Mikio Tahara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/679,063

(22) Filed: Aug. 16, 2017

(65) Prior Publication Data

US 2018/0061576 A1    Mar. 1, 2018

(30) Foreign Application Priority Data

Aug. 25, 2016 (JP) ................. 2016-165015

(51) Int. Cl.
| | |
|---|---|
| *H01G 4/232* | (2006.01) |
| *H01G 4/30* | (2006.01) |
| *H01G 4/248* | (2006.01) |
| H01G 4/008 | (2006.01) |
| H01G 4/12 | (2006.01) |

(52) U.S. Cl.
CPC .............. *H01G 4/30* (2013.01); *H01G 4/2325* (2013.01); *H01G 4/248* (2013.01); *H01G 4/008* (2013.01); *H01G 4/12* (2013.01); *H01G 4/1227* (2013.01)

(58) Field of Classification Search
CPC .......... H01G 4/30; H01G 4/228; H01G 4/232
See application file for complete search history.

(56) References Cited

U.S. PATENT DOCUMENTS

| | | | | |
|---|---|---|---|---|
| 6,002,577 | A * | 12/1999 | Wada .................... | H01G 4/232 361/303 |
| 6,344,963 | B1 * | 2/2002 | Mori ..................... | H01G 4/232 361/306.3 |
| 6,381,117 | B1 | 4/2002 | Nakagawa et al. | |
| 8,102,640 | B2 * | 1/2012 | Ogawa ................. | H01G 4/005 361/306.3 |
| 2007/0223177 | A1 * | 9/2007 | Ito ....................... | H01G 4/0085 361/321.2 |

(Continued)

FOREIGN PATENT DOCUMENTS

| | | |
|---|---|---|
| JP | 3376970 B2 | 2/2003 |
| JP | 2013165180 A | 8/2013 |

(Continued)

*Primary Examiner* — Eric W Thomas
(74) *Attorney, Agent, or Firm* — Law Office of Katsuhiro Arai

(57) ABSTRACT

A multilayer ceramic capacitor includes: a multilayer chip having a parallelepiped shape in which each of a plurality of ceramic dielectric layers and each of a plurality of internal electrode layers are alternately stacked and are alternately exposed to two edge faces of the multilayer chip; and a pair of external electrodes that are formed from the two edge faces to at least one of side faces of the multilayer chip; wherein in the external electrodes, a first metal layer whose ceramic amount is 5 wt % or more contacts with the two edge faces, and a second metal layer whose ceramic amount is less than 5 wt % contacts with the at least one of the side faces.

5 Claims, 6 Drawing Sheets

(56) References Cited

U.S. PATENT DOCUMENTS

| | | | |
|---|---|---|---|
| 2012/0162856 A1* | 6/2012 | Lee | H01B 1/16 |
| | | | 361/305 |
| 2013/0208401 A1 | 8/2013 | Shirakawa et al. | |
| 2014/0022691 A1 | 1/2014 | Kwag et al. | |
| 2016/0042868 A1 | 2/2016 | Otsuka et al. | |
| 2016/0095223 A1* | 3/2016 | Yoshida | H01G 4/2325 |
| | | | 174/260 |

FOREIGN PATENT DOCUMENTS

| | | |
|---|---|---|
| JP | 2014022712 A | 2/2014 |
| JP | 2014203910 A | 10/2014 |
| JP | 2015043424 A | 3/2015 |
| JP | 2016009836 A | 1/2016 |

* cited by examiner

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2016-165015, filed on Aug. 25, 2016, the entire contents of which are incorporated herein by reference.

FIELD

A certain aspect of the present invention relates to a multilayer ceramic capacitor and a manufacturing method of a multilayer ceramic capacitor.

BACKGROUND

A crack may occur in a multilayer ceramic capacitor because of stress caused by deflection of a substrate, after the multilayer ceramic capacitor is mounted on the substrate. There is disclosed a technology in which the crack is suppressed (for example, see Japanese Patent Application Publication No. 2015-43424). In the technology, two sintered metal layers whose glass component is different from each other are used for external electrodes.

SUMMARY OF THE INVENTION

However, in the above-mentioned technology, an amount of the glass component is not specified. Therefore, the crack is not sufficiently suppressed.

The present invention has a purpose of providing a multilayer ceramic capacitor and a manufacturing method of the multilayer ceramic capacitor that are capable of suppressing occurrence of a crack.

According to an aspect of the present invention, there is provided a multilayer ceramic capacitor including: a multilayer chip having a parallelepiped shape in which each of a plurality of ceramic dielectric layers and each of a plurality of internal electrode layers are alternately stacked and are alternately exposed to two edge faces of the multilayer chip; and a pair of external electrodes that are formed from the two edge faces to at least one of side faces of the multilayer chip; wherein in the external electrodes, a first metal layer whose ceramic amount is 5 wt % or more contacts with the two edge faces, and a second metal layer whose ceramic amount is less than 5 wt % contacts with the at least one of the side faces.

According to another aspect of the present invention, there is provided a manufacturing method of a multilayer ceramic capacitor including: forming a ceramic multilayer structure having a parallelepiped shape by alternately stacking ceramic dielectric green sheets and conductive pastes for forming internal electrodes and alternately exposing the conductive pastes to two edge faces of the ceramic multilayer structure; forming a multilayer chip by baking the ceramic multilayer structure; providing a first metal paste including a glass component so as to contact with the two edge faces; providing a second metal paste including less glass component than the first metal paste so as to contact with the first metal paste and at least one of side faces of the multilayer chip; and forming a first metal layer and a second metal layer by baking the first metal paste and the second metal paste, the first metal layer including 5 wt % or more of ceramic and contacting with the two edge faces, the second metal layer whose ceramic amount is less than 5 wt % contacting with the at least one of the side faces.

According to another aspect of the present invention, there is provided a manufacturing method of a multilayer ceramic capacitor comprising: forming a ceramic multilayer structure having a parallelepiped shape by alternately stacking ceramic dielectric green sheets and conductive pastes for forming internal electrodes and alternately exposing the conductive pastes to two edge faces of the ceramic multilayer structure; providing a first metal paste including a ceramic component so as to contact with the two edge faces; providing a second metal paste including less ceramic component than the first metal paste so as to contact with the first metal paste and contact with at least one of side faces of the ceramic multilayer structure; and forming a first metal layer and a second metal layer by baking a resulting ceramic multilayer structure, the first metal layer including 5 wt % or more of ceramic and contacting with the two edge faces, the second metal layer whose ceramic amount is less than 5 wt % contacting with the at least one of the side faces.

DETAILED DESCRIPTION

A description will be given of an embodiment with reference to the accompanying drawings.

Embodiment

Figure 1:
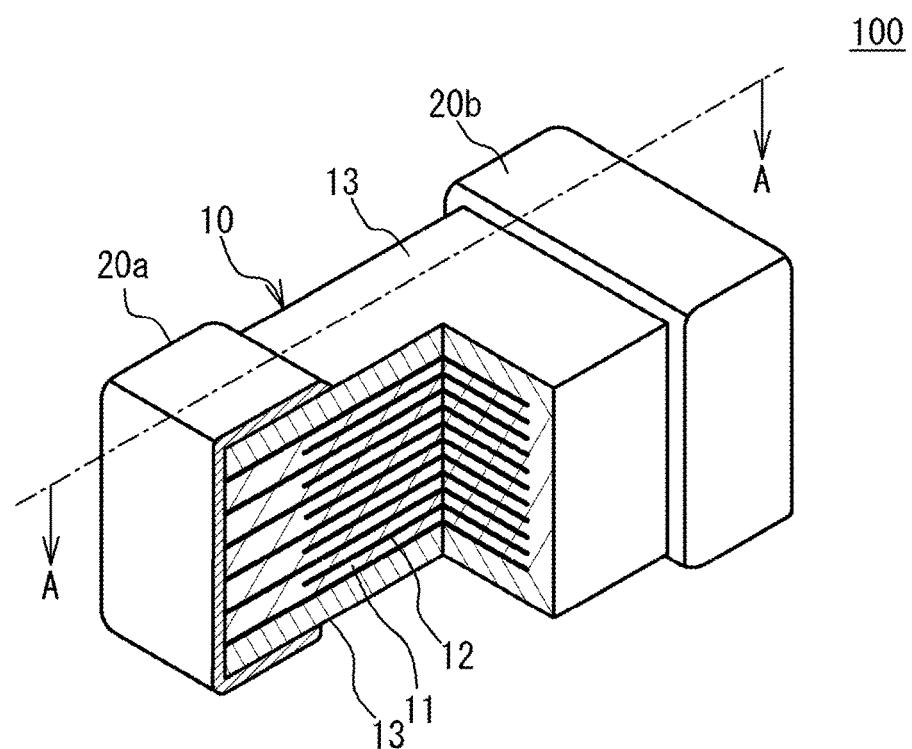
FIG. 1 illustrates a partial perspective view of a multilayer ceramic capacitor.

A description will be given of a multilayer ceramic capacitor. FIG. 1 illustrates a partial perspective view of a multilayer ceramic capacitor 100. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. Four faces of the multilayer chip 10 other than the two edge faces are referred to as side faces. The external electrodes 20a and 20b extend to the four side faces. However, the external electrodes 20a and 20b are spaced from each other on the four side faces.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first end face of the multilayer chip 10 and a second end face of the multilayer chip 10 that is different from the first end face. In the embodiment, the first face faces with the second face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, both end faces in the stack direction of the dielectric layers 11 and the internal electrode layers 12 (hereinafter referred to as stack direction) are covered by cover layers 13. For example, a main component of the cover layer 13 is the same as that of the dielectric layer 11.

For example, the multilayer ceramic capacitor 100 may have a length of 0.2 mm, a width of 0.1 mm and a height of 0.3 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of noble metal such as platinum (Pt), palladium (Pd), silver (Ag), gold (Au) or alloy thereof. The dielectric layers 11 are mainly composed of barium titanate ($BaTiO_3$) having a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2A:
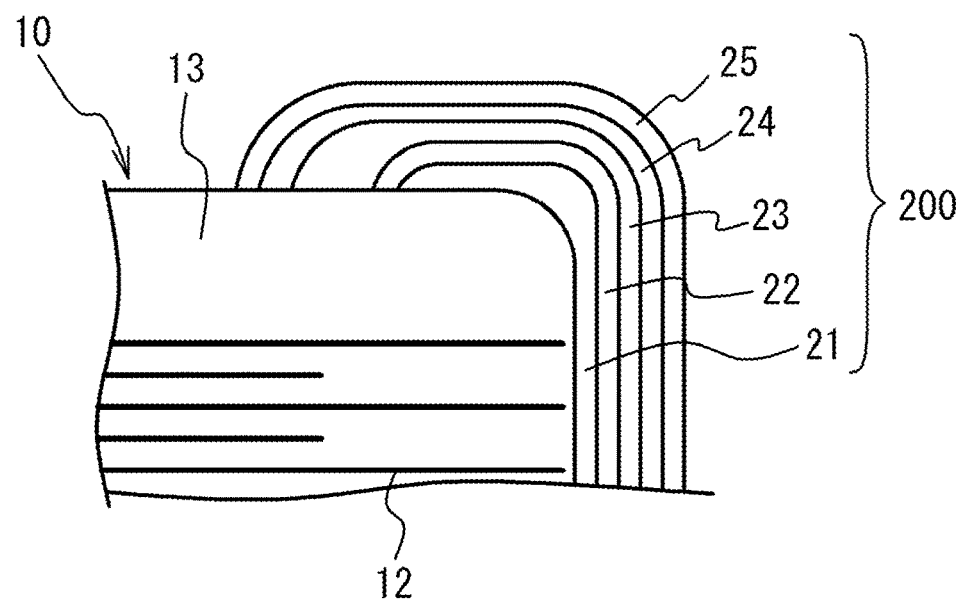
FIG. 2A and FIG. 2B illustrate external electrodes in accordance with a comparative embodiment.

A description will be given of an external electrode 200 in accordance with a comparative embodiment. FIG. 2A illustrates a cross sectional view of the external electrode 200 and is a cross sectional view taken along a line A-A of FIG. 1. In FIG. 2A, hatching for cross section is omitted. As illustrated in 2A, the external electrode 200 has a structure in which a Cu-plated layer 22, a conductive resin layer 23, a Ni-plated layer 24 and a Sn-plated layer 25 are formed on a ground layer 21 in this order. The ground layer 21, the Cu-plated layer 22, the conductive resin layer 23, the Ni-plated layer 24 and the Sn-plated layer 25 extend toward the four side faces of the multilayer chip 10 from the both edge faces of the multilayer chip 10.

A main component of the ground layer 21 is a metal such as Cu, Ni, Al (aluminum) or Zn (zinc). The ground layer 21 includes a glass component for densifying the ground layer 21 or a co-material for controlling sinterability of the ground layer 21. The ground layer 21 including these ceramic components has high adhesiveness with the cover layer 13 whose main component is a ceramic material. The conductive resin layer 23 is a resin layer including metal filler such as silver. The conductive resin layer 23 is flexible. Therefore, the conductive resin layer 23 releases stress caused by deflection of a substrate on which the multilayer ceramic capacitor 100 is mounted.

However, the conductive resin layer 23 is easy to become thicker, because the conductive resin layer 23 is formed by a coating or the like. Therefore, the structure in which the ground layer 21 sandwiches the conductive resin layer 23 with the plated layers has disadvantage in downsizing the multilayer ceramic capacitor 100 and enlarging capacitance of the multilayer ceramic capacitor 100. In particular, the thickness of the external electrodes 20a and 20b of the part on the side faces of the multilayer chip 10 has large influence on a low height type of the multilayer ceramic capacitor 100. Cost may increase because an expensive metal such as silver is used for the conductive resin layer 23. And so, a description will be given of an external electrode 200a that does not include the conductive resin layer 23.

Figure 2B:
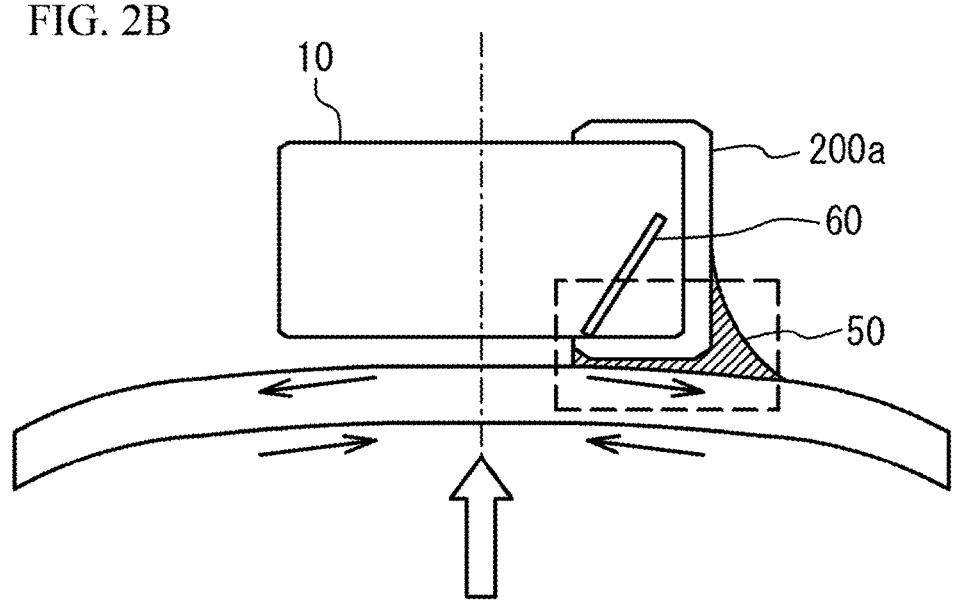

As illustrated in FIG. 2B, when the multilayer ceramic capacitor is mounted on the substrate, the part of the external electrode 200a on the both edge faces and any one of the side faces of the multilayer chip 10 are mounted with a solder 50. In this case, when the deflection occurs in the substrate, the stress caused by the deflection is conducted to the external electrode 200a on the side face of the multilayer chip 10. Thus, stress occurs in a region surrounded by a broken line of FIG. 2B. This results in a crack 60 in the multilayer chip 10.

Figure 3A:
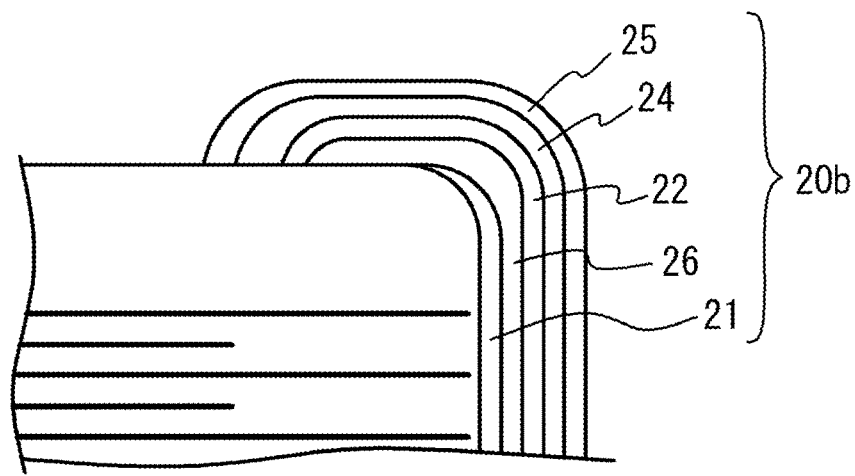
FIG. 3A and FIG. 3B illustrate external electrodes in accordance with an embodiment.

And so, in the embodiment, as illustrated in FIG. 3A, the external electrodes 20a and 20b have a structure in which a metal layer 26, the Cu-plated layer 22, the Ni-plated layer 24 and the Sn-plated layer 25 are formed on the ground layer 21 in this order. Although FIG. 3A illustrates the external electrode 20b, the external electrode 20a has the same structure as the external electrode 20b.

The ground layer 21 includes a glass component for densifying the ground layer 21 and the co-material for improving the sinterability of the ground layer 21. The glass component is an oxide of Ba, Sr, Ca, Zn, Al, Si (silicon), B (boron) or the like. The co-material is a ceramic component, and may be a main component of the dielectric layer 11. The ground layer 21 includes the glass component of 5 wt % or more, or the co-material of 5 wt % or more. The ground layer 21 is provided on the edge faces of the multilayer chip 10. However, the ground layer 21 does not extend to the side faces of the multilayer chip 10. The metal layer 26 extends toward the four side faces of the multilayer chip 10 from the ground layer 21 on the edge faces of the multilayer chip 10. The metal layer 26 includes a metal of 90 wt % or more and includes the glass component of less than 5 wt % or the co-material of less than 5 wt %. Alternatively, the metal layer 26 includes neither the glass component nor the co-material. The Cu-plated layer 22, the Ni-plated layer 24 and the Sn-plated layer 25 may extend from the edge faces of the multilayer chip 10 to the side faces to which the metal layer 26 extends.

Figure 3B:
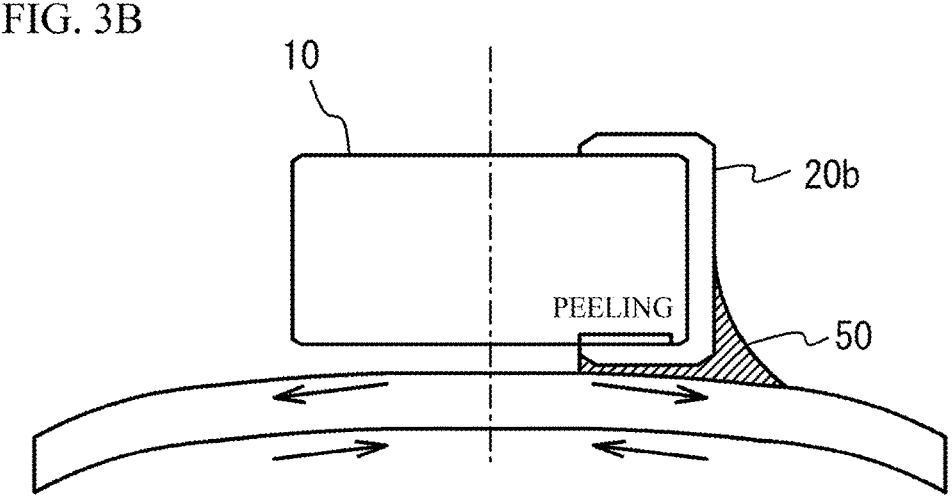

The adhesiveness between the ground layer 21 including a lot of ceramic component and the dielectric layer 11 whose main component is a ceramic material is high. Therefore, preferable adhesiveness can be achieved between the external electrodes 20a and 20b and the multilayer chip 10, on the both edge faces of the multilayer chip 10. On the other hand, the amount of ceramic in the metal layer 26 is small. Therefore, adhesiveness is not sufficiently achieved between the metal layer 26 and the cover layer 13. That is, the external electrodes 20a and 20b are easily peeled from the multilayer chip 10 on the side face region of the multilayer chip 10. Thus, as illustrated in FIG. 3B, when deflection occurs in the substrate on which the multilayer ceramic capacitor 100 is mounted and stress is conducted to the side face of the multilayer chip 10, the metal layer 26 is peeled from the multilayer chip 10. In this case, conduction of the stress caused by the substrate to the multilayer chip 10 is suppressed. Therefore, the crack of the multilayer ceramic capacitor 100 is suppressed. On the edge face of the multilayer chip 10, the peeling of the external electrodes 20a and 20b is suppressed. Therefore, the connection between the external electrodes 20a and 20b and the internal electrodes 12 is maintained.

From a viewpoint of the peeling, it is preferable that the amount of the ceramic such as the glass component, the co-material or the like in the metal layer 26 is small. For example, it is preferable that the ceramic amount in the metal layer 26 is 2 wt % or less.

When at least a part of the external electrodes 20a and 20b on the side face of the multilayer chip 10 acting as a mounting face is the metal layer 26, the stress from the substrates is suppressed. Therefore, at least a part of the electrodes 20a and 20b on the side face of the multilayer chip 10 acting as the mounting face is the metal layer 26.

The metal layer 26 may contact with the edge face of the cover layer 13 instead of the portion where the ground layer 21 contacts with the edge face of the cover layer 13. In this structure, the connection between the external electrodes 20a and 20b and the internal electrode 12 is maintained.

Figure 4:
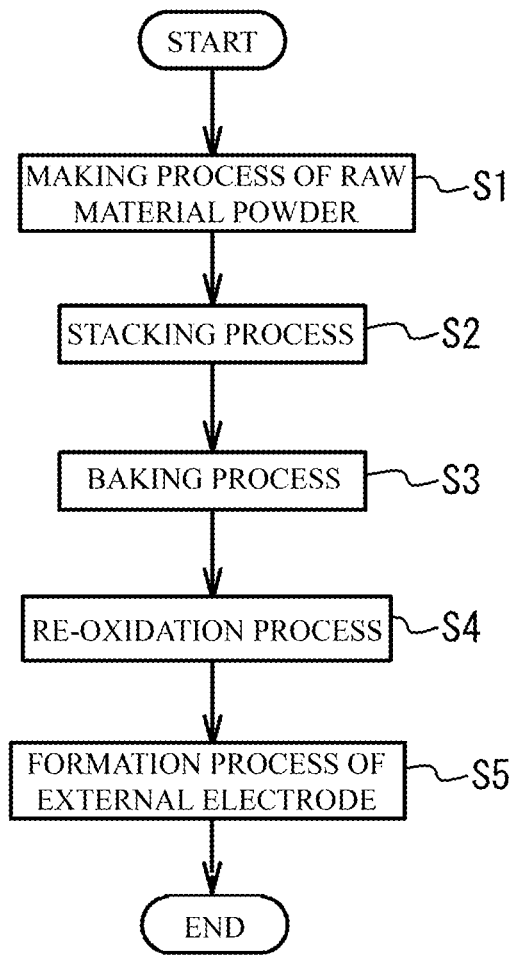
FIG. 4 illustrates a manufacturing method of a multilayer ceramic capacitor.

Next, a description will be given of a manufacturing method of the multilayer ceramic capacitor 100. FIG. 4 illustrates a manufacturing method of the multilayer ceramic capacitor 100.

(Making process of raw material powder) Additive compound may be added to ceramic powder that is a main component of the dielectric layer 11, in accordance with purposes. The additive compound may be an oxide of Mg (magnesium), Mn (manganese), V (vanadium), Cr (chromium) or a rare earth element (Y (yttrium), Dy (dysprosium), Tm (thulium), Ho (holmium), Tb (terbium), Yb (ytterbium), Sm (samarium), Eu (europium), Gd (gadolinium) and Er (erbium)), or an oxide of Co (cobalt), Ni, Li (lithium), B, Na (sodium), K (potassium) and Si, or glass. For example, compound including additive compound is added to ceramic material powder and is calcined. Next, the resulting ceramic material grains are wet-blended with additive compound, is dried and is crushed. Thus, the ceramic material powder is adjusted.

(Stacking Process) Next, a binder such as polyvinyl butyral (PVB) resin, an organic solvent such as ethanol or toluene, and a plasticizer such as dioctyl phthalate (DOP) are added to the resulting ceramic powder and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes powder of the main component metal of the internal electrode layer 12, binder, solvent, and additives as needed. It is preferable that the binder and the solvent are different from those of the above-mentioned ceramic slurry. As a co-material, the conductive paste may include the ceramic material that is the main component of the dielectric layer 11.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are stacked on the stacked green sheets and under the stacked sheets. The resulting compact is cut into a predetermined size (for example, 1.0 mm×0.5 mm). Thus, a ceramic multilayer structure having a rectangular parallelepiped shape is obtained.

(Baking process) The binder is removed from the resulting ceramic multilayer structure in $N_2$ atmosphere of a temperature range of 250 degrees C. to 500 degrees C. After that, the resulting ceramic multilayer structure is baked for ten minutes to 2 hours in a reductive atmosphere in a temperature range of 1100 degrees C. to 1300 degrees C. Thus, each compound of the dielectric green sheet is sintered and grown into grains. In this manner, it is possible to manufacture the multilayer ceramic capacitor 100 that has the multilayer chip 10 having the multilayer structure in which the sintered dielectric layers 11 and the sintered internal electrode layers 12 are alternately stacked and has the cover layers 13 formed as outermost layers of the multilayer chip 10 in the stack direction.

(Re-oxidizing process) In the embodiment, a re-oxidizing process may be performed in $N_2$ gas atmosphere in a temperature range of 600 degrees C. to 1000 degrees C.

(Forming process of external electrode) Next, the external electrodes 20a and 20b are formed on the multilayer chip 10. As a forming method of the external electrodes 20a and 20b, there are a method of baking the ground layer 21 after baking the multilayer chip 10 and a method of baking the multilayer chip 10 together with the ground layer 21. A description will be given of the method of baking the ground layer 21 after baking the multilayer chip 10.

A metal paste A including a metal filler, a glass frit, a binder and a solvent is coated on the both edge faces of the multilayer chip 10, and is dried. An amount of the glass frit is 5 weight parts or more. Next, a metal paste B including a metal filler, a binder and a solvent is coated from on the metal paste A to each side face of the multilayer chip 10 and is dried. The metal paste B does not include a glass frit. Sintering of the metal paste B is delayed. It is therefore preferable that the sintering property is adjusted by reducing a diameter of the metal filler or the like. After that, the metal paste A and the metal paste B are baked. Thus, the ground layer 21 and the metal layer 26 are formed. The binder and the solvent vaporize by the baking. After that, the Cu-plated layer 22, the Ni-plated layer 24 and the Sn-plated layer 25 are formed on the ground layer 21 by plating. In the method, it is preferable that the metal filler is Cu or the like. It is preferable that the baking is performed for three minutes to 30 minutes in a temperature range of 700 degrees C. to 900 degrees C. It is more preferable that the baking is performed for 5 minutes to 15 minutes in a temperature range of 760 degrees C. to 840 degrees C. There may be a difference between a doped amount of glass or co-material included in the metal paste A and an amount of the glass or the co-material detected from a product, because of the baking condition in this case. For example, when the doped glass is 10 weight part, the amount of the glass in the baked product may be 5 wt % to 9 wt %. This is because the glass or the co-material are diffused to the multilayer chip 10.

In the method, the amount of the glass of the side face of the multilayer chip 10 is reduced. Thus, even if a plurality of multilayer ceramic capacitors contact with each other, fusion of the plurality of multilayer ceramic capacitors is suppressed. When the metal paste A absorbs the solvent of the metal paste B during the coating of the metal paste B, viscosity of the metal paste B increases. It is therefore possible to enlarge the thickness of the metal layer 26 on a corner of the multilayer chip 10.

Figure 5:
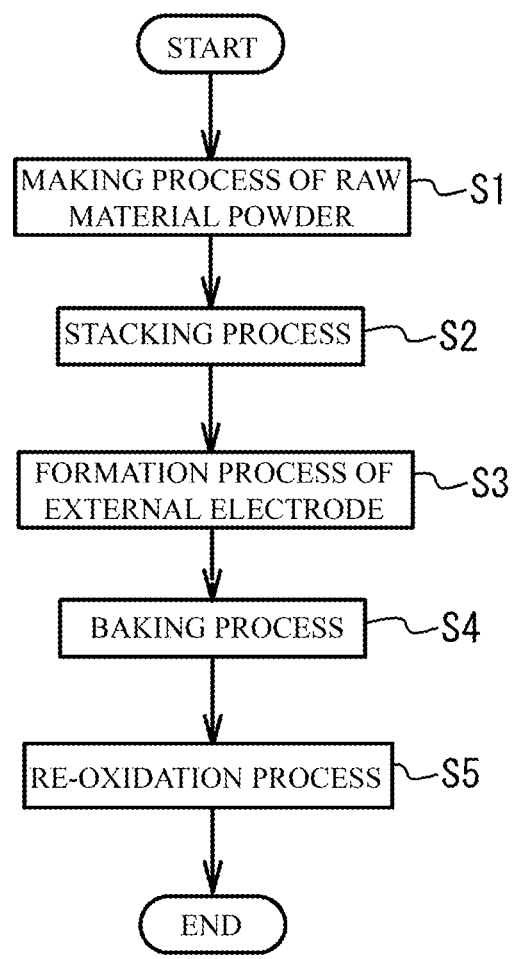
FIG. 5 illustrates another manufacturing method of a multilayer ceramic capacitor.

Next, a description will be given of the method of baking the multi layer chip 10 together with the ground layer 21. In this case, as illustrated in FIG. 5, the binder is removed from the ceramic multilayer structure made in the stacking process in N₂ atmosphere in a temperature range of 250 degrees C. to 500 degrees C. After that, the metal paste A including the metal filler, the co-material, the binder and the solvent is coated on the both edge faces of the ceramic multilayer structure and is dried. Next, the metal paste B including the metal filler, the binder and the solvent is coated from on the metal paste A to each side face of the ceramic multilayer structure and is dried. The metal paste B does not include the co-material.

With the manufacturing method in accordance with the embodiment, the ground layer 21 whose ceramic amount is 5 wt % or more ant the metal layer 26 whose ceramic amount is less than 5 wt % are formed. The adhesiveness between the ground layer 21 including a lot of ceramic component and the dielectric layer 11 whose main component is a ceramic material is high. Therefore, preferable adhesiveness can be achieved between the external electrodes 20a and 20b and the multilayer chip 10, on the both edge faces of the multilayer chip 10. On the other hand, the amount of ceramic in the metal layer 26 is small. Therefore, adhesiveness is not sufficiently achieved between the metal layer 26 and the cover layer 13. That is, the external electrodes 20a and 20b are easily peeled from the multilayer chip 10 on the side face region of the multilayer chip 10. Thus, when deflection occurs in the substrate on which the multilayer ceramic capacitor 100 is mounted and stress is conducted to the side face of the multilayer chip 10, the metal layer 26 is peeled from the multilayer chip 10. In this case, conduction of the stress caused by the substrate to the multilayer chip 10 is suppressed. Therefore, the crack of the multilayer ceramic capacitor 100 is suppressed. On the edge face of the multilayer chip 10, the peeling of the external electrodes 20a and 20b is suppressed. Therefore, the connection between the external electrodes 20a and 20b and the internal electrodes 12 is maintained.

In the embodiment, the ground layer 21 is an example of a first metal layer that includes 5 wt % or more of ceramic and contacts with the two edge faces of the multilayer chip 10. The metal layer 26 is an example of a second metal layer whose ceramic amount is less than 5 wt % contacts with at least one of the side faces of the multilayer chip 10.

EXAMPLES

The multilayer ceramic capacitors in accordance with the embodiment were made and the property was measured.

Example 1

Figure 6:
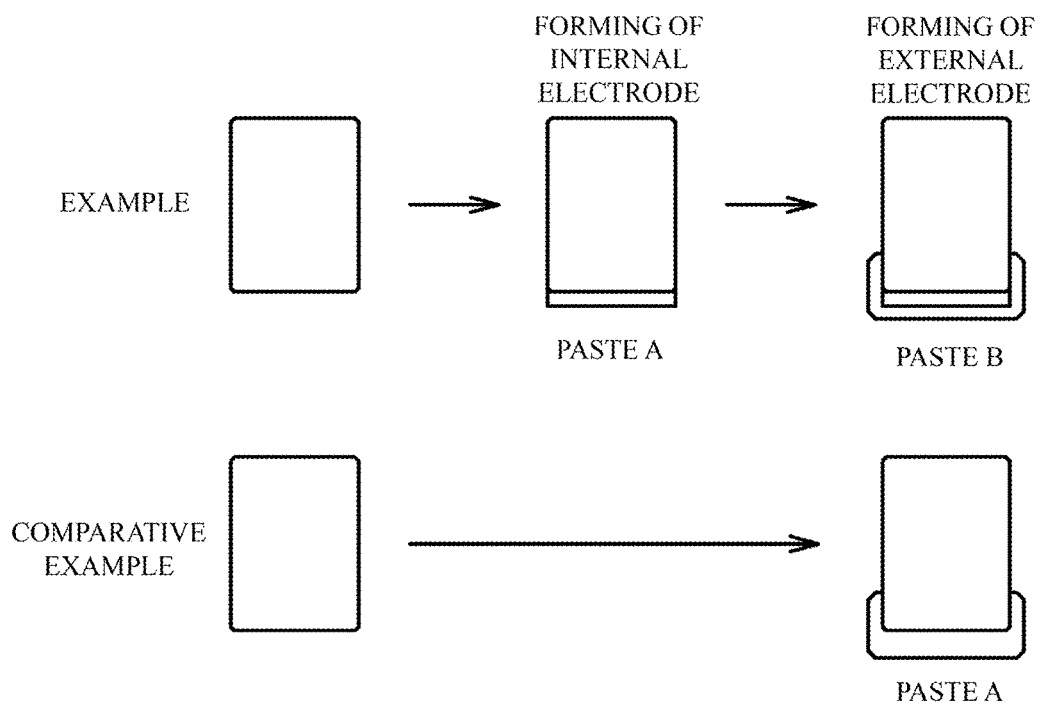
FIG. 6 illustrates an example and a comparative example.

The multilayer chip 10 baked without forming the external electrodes was prepared. A length, a width and a height of the multilayer chip were 3.2 mm, 1.6 mm and 1.6 mm. The multilayer chip 10 had a capacitance of 10 μF. As illustrated in FIG. 6, the metal paste A including a Cu filler, a glass frit, a binder and a solvent was coated on the both edge faces of the multilayer chip 10 and was dried. Next, the metal paste B including the Cu filler, the glass frit, the binder and the solvent was coated from on the metal paste A to each side face of the multilayer chip 10 and was dried. The metal paste B did not include the glass frit. The sintering of the metal paste B without the glass frit was delayed. Therefore, the diameter of the Cu filler is reduced to approximately 1/10 to 1/2. And, the sintering property was adjusted. Table 1 shows the amount of the glass frit, the material of the binder and the material of the solvent.

TABLE 1

|  | PASTE A | PASTE B |
| --- | --- | --- |
| Cu FILLER | 3 μm | 0.5 μm |
| GLASS | 10 WEIGHT PART | 0 WEIGHT PART |
| BINDER | ACRYLIC BINDER | ACRYLIC BINDER |
| SOLVENT | TERPINEOL | TERPINEOL |

After that, the metal paste A and the metal paste B were baked. Thus, the ground layer 21 and the metal layer 26 were formed. The binder and the solvent vaporized by the baking. After that, the Cu-plated layer 22, the Ni-plated layer 24 and the Sn-plated layer 25 were formed on the ground layer 21. Ten thousands of samples of the example 1 were made.

In the comparative example 1, the metal paste B was not coated, and the metal paste A was coated from on the both edge faces to each side face of the multilayer chip 10 and was dried. The other conditions were the same as the example 1. Ten thousands of samples of the comparative example 1 were made.

With respect to the example 1 and the comparative example 1, 10 of ten thousands samples were subjected to a deflection test. In the deflection test, a pressing amount was 10 mm. After the test, a crack incidence rate was measured. Table 2 shows results of the deflection test. In the comparative example 1, a crack occurred. On the other hand, in the example 1, the crack incidence rate was suppressed to 0/10. This is because the metal layer 26 was peeled when the stress caused by the deflection was conducted to the external electrodes 20a and 20b.

TABLE 2

|  | EXAMPLE 1 | COMPARATIVE EXAMPLE 1 |
| --- | --- | --- |
| CRACK INCIDENCE RATE | 0/10 | 9/10 |

The product fusion rate and an average thickness of the metal layer 26 on the corner of the multilayer chip 10 were measured. Table 3 and Table 4 show the measured results. As shown in Table 3, in the example 1, the fusion incidence rate was reduced. This is because the glass amount on the side face of the multilayer chip 10 was reduced. As shown in Table 4, in the example 1, the thickness on the corner was enlarged. This is because the metal paste A absorbed the solvent of the metal paste B during the coating of the metal paste B, and the viscosity of the metal paste B increased.

TABLE 3

|  | EXAMPLE 1 | COMPARATIVE EXAMPLE 1 |
| --- | --- | --- |
| FUSION INCIDENCE RATE | 0.05% | 0.75% |

TABLE 4

|  | EXAMPLE 1 | COMPARATIVE EXAMPLE 1 |
| --- | --- | --- |
| THICKNESS OF CORNER | 4.3 μm | 2.0 μm |

Example 2

The multilayer chip 10 (multilayer structure) before the baking was prepared. A length, a width and a height of the multilayer chip 10 were 3.2 mm, 1.6 mm and 1.6 mm when the multilayer chip 10 was obtained from the multilayer structure. A capacitance of the multilayer chip 10 was 10 μF. The metal pastes C including a Ni filler, a co-material, a binder and a solvent was coated on the both edge faces of the multilayer structure, and was dried. Next, the metal paste D including a Ni filler, a binder and a solvent was coated from on the metal paste C to each side face of the multilayer structure and was dried. The metal paste D did not include the co-material. The sintering of the metal paste D was promoted. The sintering property was adjusted by increasing the diameter of the Ni filler to twice to five times. Table 5 shows amount of the mixed co-material, the material of the binder and the material of the solvent.

TABLE 5

|  | PASTE C | PASTE D |
|---|---|---|
| Ni FILLER | 0.5 μm | 1 μm |
| GLASS | 25 WEIGHT PART | 0 WEIGHT PART |
| BINDER | ACRYLIC BINDER | ACRYLIC BINDER |
| SOLVENT | TERPINEOL | TERPINEOL |

After that, the metal paste C and the metal paste D were baked together with the multilayer structure. After that, the Cu-plated layer 22, the Ni-plated layer 24 and the Sn-plated layer 25 were formed on the ground layer 21 by plating. Ten thousands of samples of the example 2 were made.

In the comparative example 2, the metal paste D was not coated, and the metal paste C was coated from on the both edge faces of the multilayer structure to each side face and was dried. The other conditions were the same as the example 2. Ten thousands of samples of the comparative example 2 were made.

With respect to the example 2 and the comparative example 2, 10 of ten thousands samples were subjected to a deflection test. In the deflection test, a pressing amount was 10 mm. After the test, a crack incidence rate was measured. Table 6 shows results of the deflection test. In the comparative example 2, a crack occurred. On the other hand, in the example 2, the crack incidence rate was suppressed to 0/10. This is because the metal layer 26 was peeled when the stress caused by the deflection was conducted to the external electrodes 20a and 20b.

TABLE 6

|  | EXAMPLE 2 | COMPARATIVE EXAMPLE 2 |
|---|---|---|
| CRACK INCIDENCE RATE | 0/10 | 8/10 |

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer chip having a parallelepiped shape in which each of a plurality of ceramic dielectric layers and each of a plurality of internal electrode layers are alternately stacked and the plurality of internal electrode layers is each alternately exposed to two edge faces of the multilayer chip; and
   a pair of external electrodes that are formed from the two edge faces to at least one of side faces of the multilayer chip;
   wherein in the external electrodes, a first metal layer whose glass component amount is 5 wt % or more contacts the two edge faces and does not extend to the at least one of side faces, and a second metal layer contacts the at least one of the side faces,
   wherein the second metal layer includes a glass component, and the amount of the glass component in the second metal layer is less than 5 wt %, and
   wherein a main component of each of the first metal layer and the second metal layer is Cu.

2. The multilayer ceramic capacitor as claimed in claim 1, wherein the second metal layer is a sintered layer.

3. The multilayer ceramic capacitor as claimed in claim 1, wherein the multilayer chip has a first cover layer and a second cover layer as outermost layers in a stacking direction of the ceramic dielectric layers, wherein the second metal layer contacts the first cover layer and the second cover layer at the two edge faces of the multilayer chip.

4. A manufacturing method of a multilayer ceramic capacitor comprising:
   forming a ceramic multilayer structure having a parallelepiped shape by alternately stacking ceramic dielectric green sheets and conductive pastes for forming internal electrodes and alternately exposing the conductive pastes to two edge faces of the ceramic multilayer structure;
   forming a multilayer chip by baking the ceramic multilayer structure;
   providing a first metal paste including a glass component so as to contact the two edge faces without extending to at least one of side faces of the multilayer chip;
   providing a second metal paste including less glass component than the first metal paste so as to contact the first metal paste and the at least one of side faces of the multilayer chip; and
   forming a first metal layer and a second metal layer by baking the first metal paste and the second metal paste, the first metal layer including 5 wt % or more of glass component and contacting the two edge faces, the second metal layer contacting the at least one of the side faces, wherein the second metal layer includes glass component, and the amount of the glass component in the second metal layer is less than 5 wt % and wherein a main component of each of the first metal layer and the second metal layer is Cu.

5. A manufacturing method of a multilayer ceramic capacitor comprising:
   forming a ceramic multilayer structure having a parallelepiped shape by alternately stacking ceramic dielectric green sheets and conductive pastes for forming internal electrodes and alternately exposing the conductive pastes to two edge faces of the ceramic multilayer structure;
   providing a first metal paste including a glass component so as to contact the two edge faces without extending to at least one of side faces of the ceramic multilayer structure;
   providing a second metal paste including less glass component than the first metal paste so as to contact the first metal paste and contact the at least one of side faces of the ceramic multilayer structure; and
   forming a first metal layer and a second metal layer by baking a resulting ceramic multilayer structure, the first metal layer including 5 wt % or more of glass component and contacting the two edge faces, the second metal layer contacting the at least one of the side faces, wherein the second metal layer includes glass component, and the amount of the glass component in the second metal layer is less than 5 wt %, and wherein a main component of each of the first metal layer and the second metal layer is Cu.

* * * * *